United States Patent
Wang

(10) Patent No.: US 8,344,632 B2
(45) Date of Patent: Jan. 1, 2013

(54) LIGHT EMITTING DEVICE

(75) Inventor: Jia-Shyang Wang, Hsinchu (TW)

(73) Assignee: Silicon Touch Technology Inc., Hsinchu (TW)

( * ) Notice: Subject to any disclaimer, the term of this patent is extended or adjusted under 35 U.S.C. 154(b) by 160 days.

(21) Appl. No.: 12/637,769

(22) Filed: Dec. 15, 2009

(65) Prior Publication Data

US 2011/0140618 A1 Jun. 16, 2011

(51) Int. Cl.
H05B 37/00 (2006.01)
H05B 37/02 (2006.01)

(52) U.S. Cl. ............... 315/185 R; 315/193; 315/209 R; 315/291; 315/312

(58) Field of Classification Search .... 315/169.1–169.4, 315/185 R, 186, 193, 195, 209 R, 225, 291, 315/307, 312
See application file for complete search history.

(56) References Cited

U.S. PATENT DOCUMENTS

| | | | |
|---|---|---|---|
| 5,490,049 A | | 2/1996 | Montalan et al. |
| 5,644,328 A | * | 7/1997 | Rhyne et al. ............... 345/82 |
| 5,671,002 A | * | 9/1997 | Murano ...................... 347/237 |
| 6,095,661 A | | 8/2000 | Lebens et al. |
| 7,274,151 B2 | * | 9/2007 | Wakou et al. ............ 315/169.3 |
| 7,884,558 B2 | * | 2/2011 | Steele et al. ................ 315/312 |
| 2005/0077838 A1 | * | 4/2005 | Blumel ....................... 315/289 |
| 2005/0174064 A1 | * | 8/2005 | Agostinelli et al. ........ 315/169.3 |

FOREIGN PATENT DOCUMENTS

| | | |
|---|---|---|
| JP | 2002-8409 | 1/2002 |
| JP | 2006-352011 | 12/2006 |
| JP | 2009-016685 | 1/2009 |
| WO | 2008091837 | 7/2008 |

OTHER PUBLICATIONS

"Office Action of Korea Counterpart Application" with English translation thereof, issued on Aug. 16, 2011, p. 1-p. 5, in which the listed reference was cited.
"Office Action of Japan Counterpart Application", issued on Feb. 15, 2012, p. 1-p. 2, in which the listed references WO2008091837 and JP2002-8409 were cited.
"Office Action of Korea Counterpart Application" with English translation thereof, issued on Feb. 1, 2012, p. 1-p. 5, in which the listed reference JP2006-352011 was cited.

* cited by examiner

*Primary Examiner* — Jimmy Vu
(74) *Attorney, Agent, or Firm* — Jianq Chyun IP Office

(57) ABSTRACT

A light emitting device including a voltage source, a light emitting unit, and a current source is provided. The voltage source is coupled to the light emitting unit for supplying a voltage. The light emitting unit includes n light emitting diodes (LEDs) and n current control switches, wherein n is greater than or equal to 3. The LEDs are respectively coupled to the current control switches in series. The current control switches are turned on and off according to a current threshold. The current source is coupled to the light emitting unit for supplying a fixed current. Thereby, the luminous intensity of the light emitting device remains stable even when some of the LEDs fail.

7 Claims, 2 Drawing Sheets

LIGHT EMITTING DEVICE

BACKGROUND OF THE INVENTION

1. Field of the Invention

The present invention generally relates to a light emitting device, and more particularly, to a light emitting device having a light source composed of light emitting diodes (LEDs).

2. Description of Related Art

Nowadays, light emitting diodes (LEDs) are increasingly adopted in various products as the light sources thanks to the small volume, low power consumption, long lifetime, and low cost of the LEDs. In addition, LED requires a very low operating voltage (only 1.5-3V), spontaneously emits light, and offers certain luminous intensity that is adjustable through the voltage or current. Besides, LED offers high shock resistance and long lifetime (100,000 hours). Thus, LED is broadly used in various terminal equipments, such as vehicle headlamps, traffic signal lamps, text displays, signboards, large-screen video displays, normal lightings, building lightings, and LCD backlights.

In an application wherein a plurality of LEDs is used as a light source, the LEDs are connected with each other in series so that the same current flowing through each LED and accordingly each LED has the same luminous intensity. However, when one of the LEDs is open-circuited, all the LEDs stop emitting light since the current cannot pass through. On the other hand, the LEDs may also be connected with each other in parallel. However, in this case, when one of the LEDs is short-circuited, almost all the current passes through the short-circuited LED. As a result, the other LEDs cannot emit light anymore due to the extremely low driving current.

FIG. 1 is a circuit diagram of a conventional light emitting device. Referring to FIG. 1, the light emitting device 100 includes a voltage source 110 and a plurality of LEDs 120, wherein these LEDs 120 present a series-parallel connection. The voltage source 110 supplies an operation voltage Vcc for driving the LEDs 120 to emit light. When one of the LEDs 120 is open-circuited, the current can still pass through other LEDs 120 connected in parallel so that the other LEDs 120 can still emit light. When one of the LEDs 120 is short-circuited, those LEDs 120 connected in parallel are affected while those LEDs 120 connected in series can still emit light. Similar structures of the light emitting device 100 are disclosed in U.S. Pat. Nos. 5,490,049 and 6,095,661, and the details of the light emitting device 100 can be referred to these patents.

However, even though the light emitting device 100 can still emit light when one of the LEDs 120 fails (short-circuited or open-circuited), the electrical character (for example, the current or voltage) of the entire light emitting device 100 changes due to the change of circuit structure caused by the failure. In other words, the luminous intensity of the entire light emitting device 100 changes when one of the LEDs 120 fails. In particular, when one of the LEDs 120 is short-circuited, all those LEDs 120 connected in parallel are affected (i.e., the entire row of LEDs 120 stop emitting light). Thus, a short-circuited LED 120 brings a greater impact than an open-circuited LED 120.

SUMMARY OF THE INVENTION

Accordingly, the present invention is directed to a light emitting device, wherein the light emitting device allows some of its light emitting elements to be defective and can still emit light with the defective light emitting elements without losing the luminous intensity of the entire light emitting device.

The present invention provides a light emitting device including a voltage source, a light emitting unit, and a current source. The light emitting unit is coupled to the voltage source. The light emitting unit includes n light emitting diodes (LEDs) and n current control switches, wherein n is greater than or equal to 3. The LEDs are respectively coupled to the current control switches in series. The current control switches are turned on and off according to a current threshold. The current source is coupled to the light emitting unit for supplying a fixed current.

The present invention also provides a light emitting device including a voltage source, a plurality of light emitting unit strings, and a plurality of current sources. The light emitting unit strings are coupled to the voltage source, and each of the light emitting unit strings has a plurality of light emitting units. Each light emitting unit includes n LEDs and n current control switches, wherein n is greater than or equal to 3. The LEDs are respectively coupled to the current control switches in series. The current control switches are turned on and off according to a current threshold. The current sources are respectively coupled to the light emitting unit strings for supplying a plurality of fixed currents.

According to an embodiment of the present invention, the current control switches are fuse switches.

According to an embodiment of the present invention, the current threshold of each light emitting unit is smaller than or equal to the fixed current of the light emitting unit and greater than half of the fixed current of the light emitting unit.

According to an embodiment of the present invention, the defect acceptance ratio of each of the light emitting units is [(n−2)/n].

According to an embodiment of the present invention, the fixed currents are the same as or different from each other.

As described above, the present invention provides a light emitting device, wherein when a LED is short-circuited, the corresponding current control switch is turned off so that other LEDs in the light emitting unit are not affected by the short-circuited LED. In addition, a fixed current is supplied by the current source such that the luminous intensity of the light emitting device remains stable regardless of any defective LED. Thereby, the lifetime of the light emitting device is extended.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
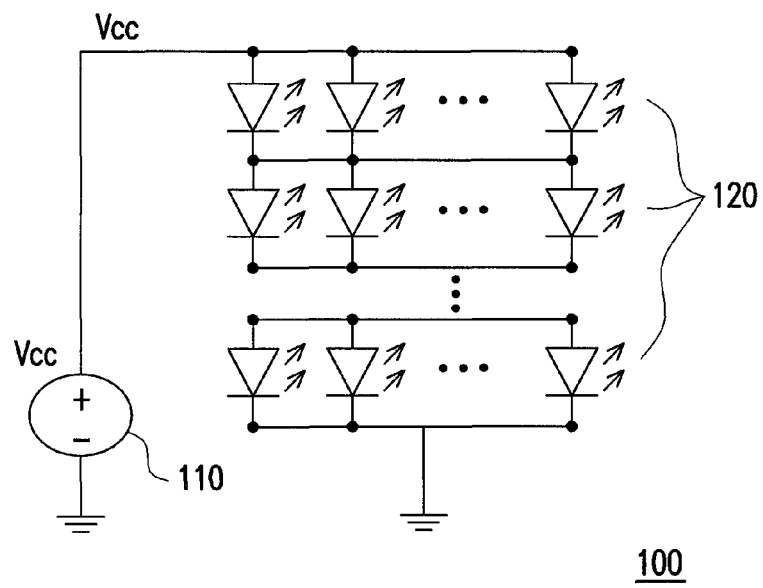
FIG. 1 is a circuit diagram of a conventional light emitting device.

Reference will now be made in detail to the present preferred embodiments of the invention, examples of which are illustrated in the accompanying drawings. Wherever possible, the same reference numbers are used in the drawings and the description to refer to the same or like parts.

A conventional light emitting device allows some of its light emitting diodes (LEDs) to fail, but the luminous intensity of the light emitting device changes if such a failure occurs. Besides, when a LED is short-circuited, those LEDs connected in parallel stop emitting light too. Thereby, the present invention provides a light emitting device to resolve aforementioned problems. Below, embodiments of the present invention will be described with reference to accompanying drawings.

Figure 2:
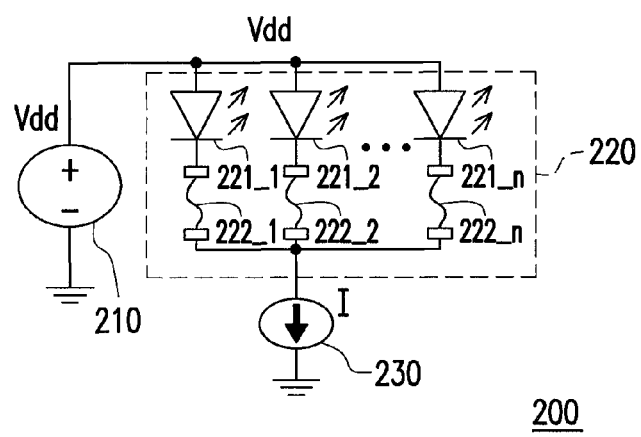
FIG. 2 is a circuit diagram of a light emitting device according to an embodiment of the present invention.

FIG. 2 is a circuit diagram of a light emitting device according to an embodiment of the present invention. Referring to FIG. 2, the light emitting device 200 includes a voltage source 210, a light emitting unit 220, and a current source 230. The voltage source 210 outputs an operation voltage Vdd, wherein the voltage source 210 may be implemented by using a driving circuit or a driving chip. The light emitting unit 220 includes LEDs 221_1~221_n and current control switches 222_1~222_n, wherein n≧3, and the current control switches 222_1~222_n are fuse switches. The current source 230 supplies a fixed current I to the light emitting unit 220. How the current source 230 generates the fixed current I is not limited herein. For example, the current source 230 may generate the fixed current I through a current mirror technique. In the present embodiment, the anodes of the LEDs 221_1~221_n receive the operation voltage Vdd, and the LEDs 221_1~221_n are driven by the operation voltage Vdd to emit light. Besides, because of the fixed current I, the current flowing through each LED is about I/n. The luminous intensity of the light emitting unit 220 is controlled by the fixed current I.

When some of the LEDs 221_1~221_n fail (for example, are short-circuited or open-circuited), each of the current control switches 222_1~222_n is respectively turned on and off according to whether the current flowing through the current control switch is greater than a current threshold or not, wherein the current threshold is smaller than or equal to the fixed current I and greater than half of the fixed current I. For example, when the LED 221_1 is short-circuited, all the current runs through the LED 221_1 (i.e., the current flowing through the LED 221_1 is equal to the fixed current I). In this case, because the current flowing through the LED 221_1 is greater than the current threshold, the current control switch 222_1 is turned off (i.e., the fuse switch is fused by the large current). Thus, no current flows through the LED 221_1 anymore, and the current of the light emitting unit 220 evenly flows through the LEDs 221_2~221_n. On the other hand, when the LED 221_1 is open-circuited, the current control switch 222_1 is still turned on since the current does not flow through the current control switch 222_1. Accordingly, the current of the light emitting unit 220 evenly passes through the LEDs 221_2~221_n.

As described above, when the LED 221_1 fails, there is still current flowing through the LEDs 221_2~221_n. Namely, the LEDs 221_2~221_n are not affected by the LED 221_1 and can still emit light normally. In addition, the current of the light emitting unit 220 remains as the fixed current I under the control of the current source 230 and flows through the LEDs 221_2~221_n. In other words, the luminous intensity of the light emitting unit 220 remains the same after the LED 221_1 fails. The situation when any one of the LEDs 221_2~221_n fails can be referred to that when the LED 221_1 fails therefore will not be described herein. Moreover, when some of the LEDs 221_1~221_n fail, the current of the light emitting unit 220 can still flow through those good LEDs, and due to the control of the fixed current I, the luminous intensity of the light emitting unit 220 remains unchanged. Thereby, the lifetime of the light emitting device 200 can be extended.

Additionally, because of the current threshold, at least two good LEDs are required to allow the light emitting unit 220 to emit light normally. Thus, when n=3, the light emitting unit 220 allows one defective LED, and the defect acceptance ratio thereof is 1/3. When n=4, the light emitting unit 220 allows two defective LEDs, and the defect acceptance ratio thereof is 2/4. As described above, the defect acceptance ratio is [(n−2)/n] in other situations. Accordingly, the greater n is, the higher defect Acceptance ratio the light emitting unit 220 has.

It should be mentioned that besides being implemented by using fuse switches, the current control switches 222_1~222_n may also be implemented by using any circuits that are turned on and off according to a current as long as a short-circuited LED is prevented from affecting other LEDs connected in parallel. Besides, the disposed positions of the current control switches 222_1~222_n and the LEDs 221_1~221_n can be exchanged.

Figure 3:
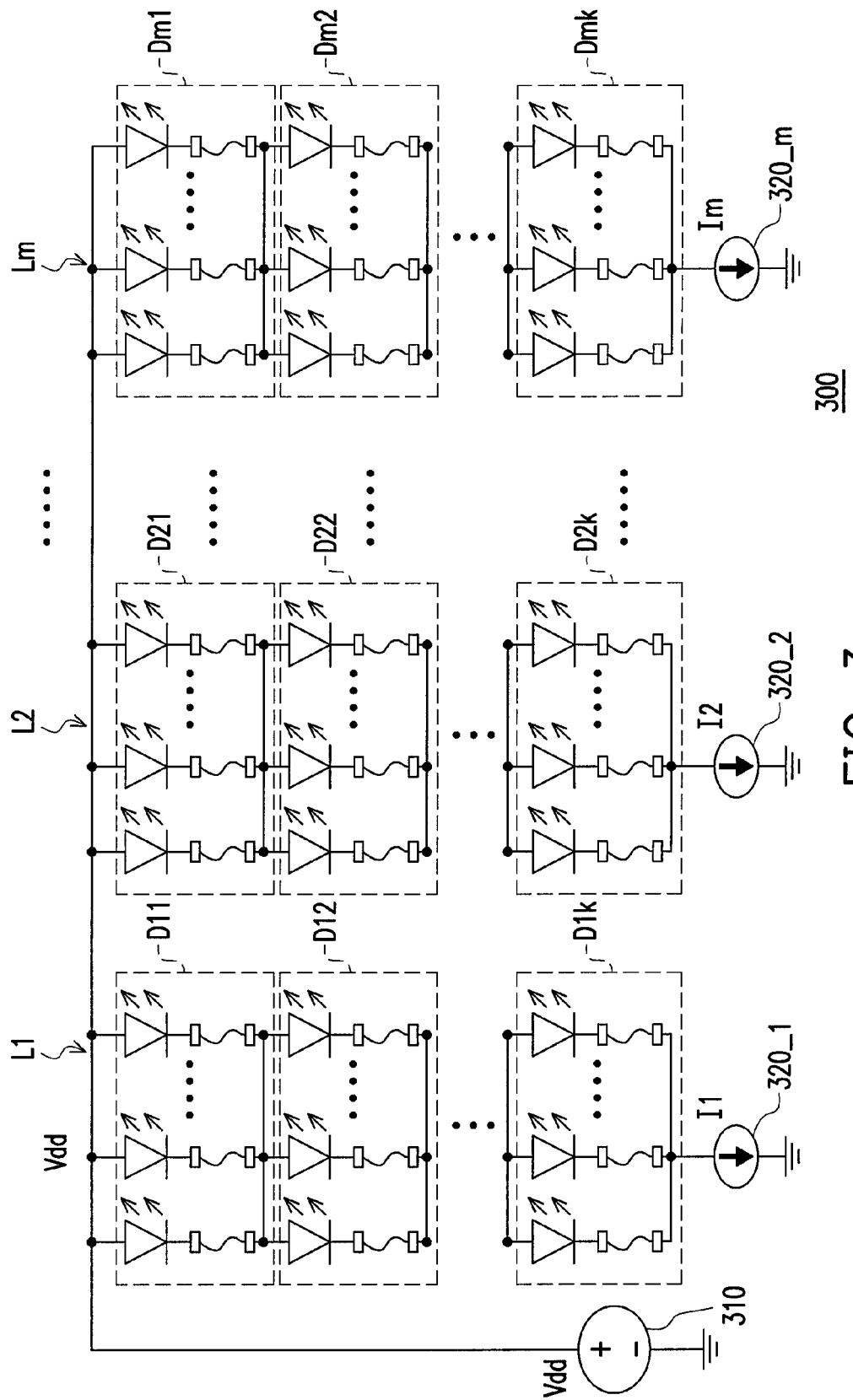
FIG. 3 is a circuit diagram of a light emitting device according to another embodiment of the present invention.

FIG. 3 is a circuit diagram of a light emitting device according to another embodiment of the present invention. Referring to FIG. 2 and FIG. 3, the difference between the two light emitting devices is that the light emitting device 300 has a plurality of light emitting unit strings L1~Lm, wherein m is greater than or equal to 1. The light emitting unit string L1 has light emitting units D11~D1k that are coupled with each other in series, wherein k is greater than or equal to 1. The light emitting unit string L2 has light emitting units D21~D2k that are coupled to each other in series. The composition of the light emitting unit strings L3~Lm can be understood accordingly. Besides, each of the light emitting units (for example, the light emitting units D11~Dmk) is similar to the light emitting unit 220 and can be understood by referring to the description of the light emitting unit 220 therefore will not be described herein.

In the light emitting unit string L1, the luminous intensities of the light emitting units D11~D1k are controlled by a fixed current I1 supplied by the current source 320_1. In the light emitting unit string L2, the luminous intensities of the light emitting units D21~D2k are controlled by a fixed current I2 supplied by the current source 320_2. Accordingly, the light emitting units D31~Dmk are respectively controlled by fixed currents I3~Im supplied by the current sources 320_3~320_m. It should be mentioned that based on the description of the light emitting unit 220, the luminous intensity of each light emitting unit string (for example, the light emitting unit strings L1~Lm) remains unchanged when some of its LEDs fail. Accordingly, the Luminous intensity of the entire light emitting device 300 remains stable. Thus, the light emitting device 300 can be applied to devices more sensitive to luminous intensity (for example, liquid crystal displays (LCDs), projectors, and operating lamps) or devices less sensitive to luminous intensity (for example, traffic signal lamps).

In addition, the fixed currents I1~Im may be designed to have the same value or different values according to different circuit requirement, so that the light emitting unit strings L1~Lm can have the same luminous intensity or different luminous intensities. Besides, the overall defect acceptance ratio of the light emitting device 300 is the total of the defect acceptance ratios of the light emitting units D11~Dmk.

As described above, the present invention provides a light emitting device, wherein when a LED is short-circuited, the corresponding current control switch is turned off due to an extremely large current, so that other LEDs in the light emitting unit are not affected by the short-circuited LED. Thereby, the lifetime of the light emitting device can be extended. In addition, a plurality of fixed currents are supplied by a plurality of current sources such that the luminous intensity of each working light emitting unit string remains unchanged regardless of any defective LED.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light emitting device, comprising:
   a voltage source;
   a light emitting unit, coupled to the voltage source, the light emitting unit comprising:
   n light emitting diodes (LEDs), wherein n is greater than or equal to 3; and
   n current control switches, respectively coupled to the LEDs in series, being turned on and off according to a current threshold; and
   a current source, coupled to the light emitting unit, for supplying a fixed current, wherein the current threshold is smaller than or equal to the fixed current and greater than a half of the fixed current.

2. The light emitting device according to claim 1, wherein the current control switches are fuse switches.

3. The light emitting device according to claim 1, wherein a defect acceptance ratio of the light emitting unit is [(n−2)/n].

4. A light emitting device, comprising:
   a voltage source;
   a plurality of light emitting unit strings, coupled to the voltage source, wherein each of the light emitting unit strings has a plurality of light emitting units, and each of the light emitting units comprises:
   n LEDs, wherein n is greater than or equal to 3; and
   n current control switches, respectively coupled to the LEDs in series, being turned on and off according to a current threshold; and
   a plurality of current sources, respectively coupled to the light emitting unit strings, for supplying a plurality of fixed currents, wherein the current threshold of each of the light emitting units is smaller than or equal to the fixed current of the light emitting unit and greater than a half of the fixed current of the light emitting unit.

5. The light emitting device according to claim 4, wherein the current control switches are fuse switches.

6. The light emitting device according to claim 4, wherein a defect acceptance ratio of each of the light emitting units is [(n−2)/n].

7. The light emitting device according to claim 4, wherein the fixed currents are the same as or different from each other.

* * * * *